(12) United States Patent
Kogure et al.

(10) Patent No.: US 11,140,291 B2
(45) Date of Patent: Oct. 5, 2021

(54) INFORMATION PROCESSING APPARATUS, CONTROL METHOD THEREOF, AND STORAGE MEDIUM

(71) Applicant: CANON KABUSHIKI KAISHA, Tokyo (JP)

(72) Inventors: Takeshi Kogure, Toride (JP); Atsushi Ikeda, Toride (JP); Hiroaki Koike, Kokubunji (JP); Naoto Sasagawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/425,765

(22) Filed: May 29, 2019

(65) Prior Publication Data

US 2019/0379800 A1 Dec. 12, 2019

(30) Foreign Application Priority Data

Jun. 8, 2018 (JP) .................. 2018-110666

(51) Int. Cl.
*H04N 1/00* (2006.01)
*H04N 1/08* (2006.01)

(52) U.S. Cl.
CPC ..... *H04N 1/00938* (2013.01); *H04N 1/00965* (2013.01); *H04N 2201/0039* (2013.01); *H04N 2201/0094* (2013.01)

(58) Field of Classification Search
CPC ............ H04N 1/00938; H04N 1/00965
See application file for complete search history.

(56) References Cited

U.S. PATENT DOCUMENTS

| 5,758,342 A | * | 5/1998 | Gregerson | .............. G06F 16/10 707/758 |
| 6,657,743 B1 | * | 12/2003 | Otsuka | .................. H04L 51/066 358/1.15 |
| 9,037,906 B2 | * | 5/2015 | Kim | ..................... G06F 11/1469 714/15 |
| 2015/0341518 A1 | * | 11/2015 | Shimizu | .................... G06F 9/44 358/1.15 |
| 2018/0039453 A1 | * | 2/2018 | Nakajima | ............... G06F 3/123 |

FOREIGN PATENT DOCUMENTS

JP  2013-69077 A  4/2013

* cited by examiner

*Primary Examiner* — Ibrahim Siddo
(74) *Attorney, Agent, or Firm* — Canon U.S.A., Inc., IP Division

(57) ABSTRACT

An image forming apparatus stores, for an application, a meta file including a setting data version and a setting data compatible version in a storage as information about the application. In a case where setting data of the application is to be imported, an application management unit of the image forming apparatus determines whether to allow import of the setting data as an import target by using a version of the setting data, a setting data version that is stored as the information about the application corresponding to the setting data as the import target, and a setting data compatible version, and determines whether to allow import of the setting data as the import target.

10 Claims, 20 Drawing Sheets

FIG.6

```
{
   "info": [
      {
601      "buttonId": 1,
602      "title": "Print Score",
603      "document": "score.bin",
604      "printSetting": "setting1.js"
      },
      {
611      "buttonId": 2,
612      "title": "Print Form1",
613      "document": "Form1.bin",
614      "printSetting": "setting2.js"
      }
   ]
}
```

FIG.12

```
        {
1201 ~   "appId": 1,
1202 ~   "title": "print form",
1203 ~   "appVersion": 1,
1204 ~   "dataVersion": 1,
1205 ~   "compatibleDataVersion": 1
        }
```

FIG.15

```
{
    "info": [
      {
          "buttonId": 1,
          "title": "Print Score",
          "document": "score.bin",
          "printSetting": "setting1.js"
      },
      {
          "buttonId": 2,
          "title": "Print Form1",
          "document": "Form1.bin",
          "printSetting": "setting2.js",
1501 ──── "password": "12345"
      }
    ]
}
```

FIG.16

```
{
    "appId": 1,
    "title": "print form",
1601 ~ "appVersion": 2,
1602 ~ "dataVersion": 2,
1603 ~ "compatibleDataVersion": 1
}
```

INFORMATION PROCESSING APPARATUS, CONTROL METHOD THEREOF, AND STORAGE MEDIUM

BACKGROUND

Field of the Disclosure

The present disclosure generally relates to information processing and, more particularly, to an information processing apparatus in which an application can be installed and executed, a control method of the information processing apparatus, and a storage medium.

Description of the Related Art

Conventionally, a system that enables a user to add an expansion program to an image forming apparatus to expand a function of the image forming apparatus has become popular. The above-described system includes an execution environment for running the expansion program in addition to a control program of the image forming apparatus (Japanese Patent Application Laid-Open No. 2013-69077).

Setting data and resource data are attached to the expansion program, which collectively constitute an expansion application.

A version of the expansion application may be updated to add or improve a function or to fix a bug. For example, a function that does not exist in a previous version may be included in a new version, or a function that exists in the previous version may not be included in the new version. In such a case, there is provided the setting data of the expansion application that includes or does not include setting data related to a function that is not included or is included. Thus, if the setting data of the expansion application in a different version is imported, the expansion application may operate incorrectly. This problem arises not only in an image forming apparatus but also in an information processing apparatus in which an application program can be installed and executed.

SUMMARY

The present disclosure is directed to a system that enables a user to securely import setting data even if import is executed between applications in different versions.

According to an aspect of the present disclosure, an information processing apparatus in which an application can be installed and executed includes a storage unit configured to store, for the application, first version information indicating a setting data version of the application and second version information by which a setting data version compatible with the application can be specified, as information about the application, and a control unit configured to determine a result, in a case where setting data of the application is to be imported, whether to allow import of the setting data as an import target by using a version of the setting data as the import target and information stored in the storage unit as information about the application corresponding to the setting data as the import target, and to determine whether to import the setting data based on the result of determination.

Further features of the present disclosure will become apparent from the following description of exemplary embodiments with reference to the attached drawings.

BRIEF DESCRIPTION OF THE DRAWINGS

FIG. 6 is a diagram illustrating an example of setting data of the expansion application.

FIG. 12 is a diagram illustrating an example of a meta file structure.

FIG. 15 is a diagram illustrating an example of setting data of an expansion application to which a function is added.

FIG. 16 is a diagram illustrating an example of information of a meta file of the expansion application to which a function is added.

DESCRIPTION OF THE EMBODIMENTS

Hereinafter, various exemplary embodiments, features, and aspects according to the present disclosure will be described with reference to the appended drawings.

Figure 1:
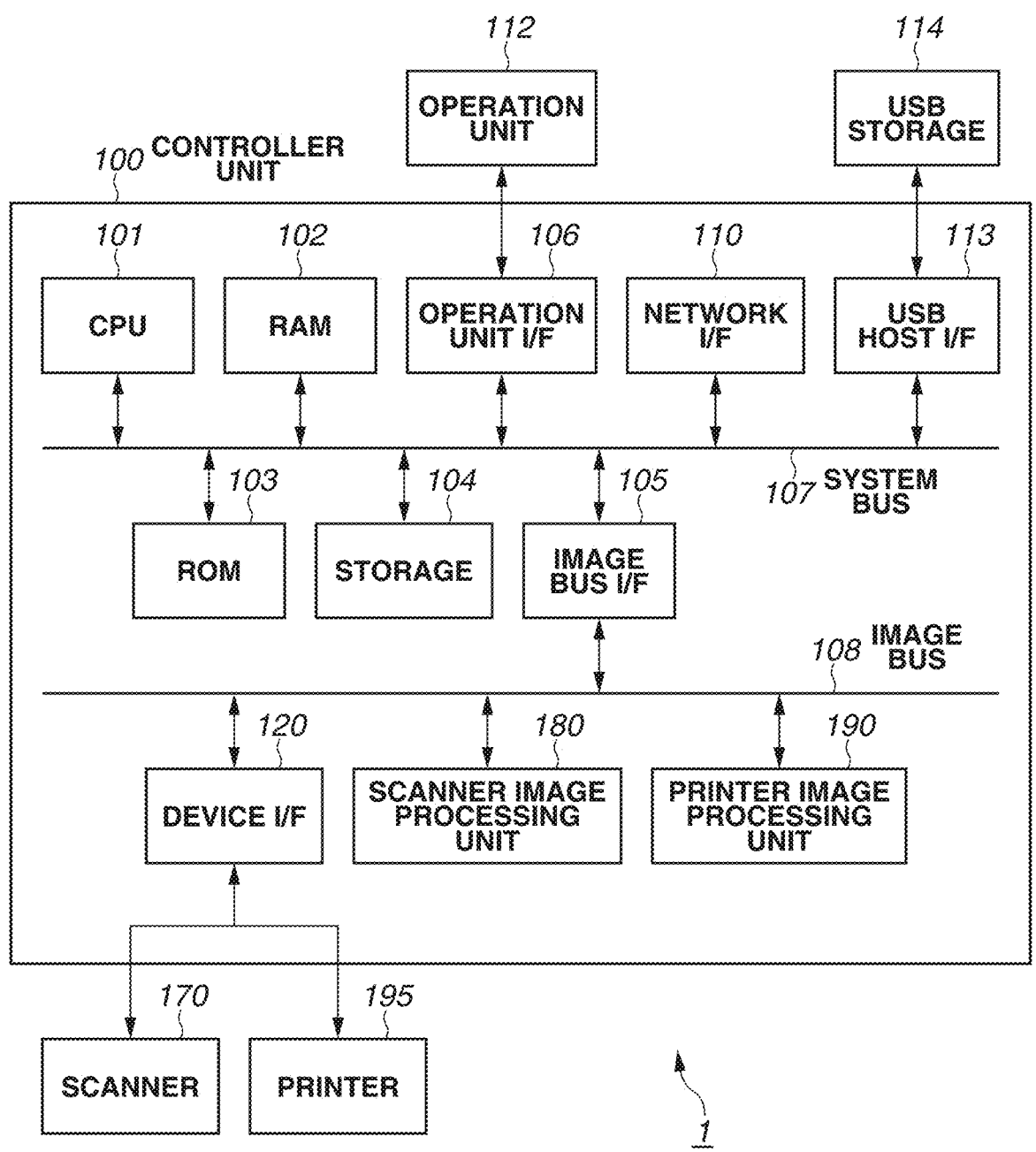
FIG. 1 is a block diagram illustrating a hardware configuration of an image forming apparatus according to an exemplary embodiment.

FIG. 1 is a block diagram illustrating an example of a main hardware configuration of an image forming apparatus as an information processing apparatus according to the exemplary embodiment of the present disclosure. In the present exemplary embodiment, although the image forming apparatus is taken as an example, the present disclosure is not limited thereto, and the present disclosure is applicable to an information processing apparatus in which an application can be installed and executed.

As illustrated in FIG. 1, an image forming apparatus 1 according to the present exemplary embodiment includes a controller unit 100. A scanner 170 serving as an image input device, a printer 195 serving as an image output device, and an operation unit 112 are connected to the controller unit 100.

The controller unit 100 executes control to implement various functions such as a copy function that prints and outputs image data, which is read by the scanner 170, from the printer 195.

The controller unit 100 includes a central processing unit (CPU) 101. The CPU 101, which may include one or more processors, one or more memories, circuitry, or a combination thereof, may boot an operating system (OS) through a boot program stored in a read only memory (ROM) 103. Then, the CPU 101 may execute a program stored in a storage 104 on the OS to execute various types of processing.

A random access memory 102 is used as a work area of the CPU 101. The RAM 102 provides an image memory area for temporarily storing image data in addition to providing the work area.

The storage 104 stores a program, image data, and various kinds of data.

Various devices are connected to the CPU 101 via a system bus 107. For example, the RAM 102, the ROM 103, and the storage 104 are connected to the CPU 101. Further, an operation unit interface (I/F) 106, a network I/F 110, and a universal serial bus (USB) host I/F 113 are connected to the CPU 101. An image bus I/F 105 is further connected to the CPU 101.

The operation unit I/F 106 serves as an interface with the operation unit 112 having a touch panel. Through the operation unit I/F 106, image data to be displayed on the operation unit 112 is output to the operation unit 112. Further, the operation unit I/F 106 transmits information that has been input by a user on the operation unit 112 to the CPU 101.

The network I/F 110 is an interface for connecting the image forming apparatus 1 to a local area network (LAN).

The USB host I/F 113 serves as an interface for communicating with a USB storage 114. The USB host I/F 113 also serves as an output unit through which the data that is stored in the storage 104 is stored in the USB storage 114. Further, through the USB host I/F 113, data that is stored in the USB storage 114 is received, and the data is transmitted to the CPU 101.

The USB storage 114 is an external storage device for storing data and is attachable to and detachable from the USB host I/F 113. A plurality of USB devices including the USB storage 114 can be connected to the USB host I/F 113.

The image bus I/F 105 is a bus bridge that connects the system bus 107 with the image bus 108, which transmits image data at high speed, and converts a data format.

For example, the image bus 108 is constituted of a peripheral component interconnect (PCI) bus or a bus compliant with the Institute of Electrical and Electronics Engineers (IEEE) 1394. A device I/F 120, a scanner image processing unit 180, and a printer image processing unit 190 are arranged on the image bus 108.

To the device I/F 120, a scanner 170 and a printer 195 are connected. The device I/F 120 executes synchronous or asynchronous conversion of image data.

The scanner image processing unit 180 corrects, processes, and edits input image data.

The printer image processing unit 190 executes correction and resolution conversion of print output image data for the printer 195.

Figure 2:
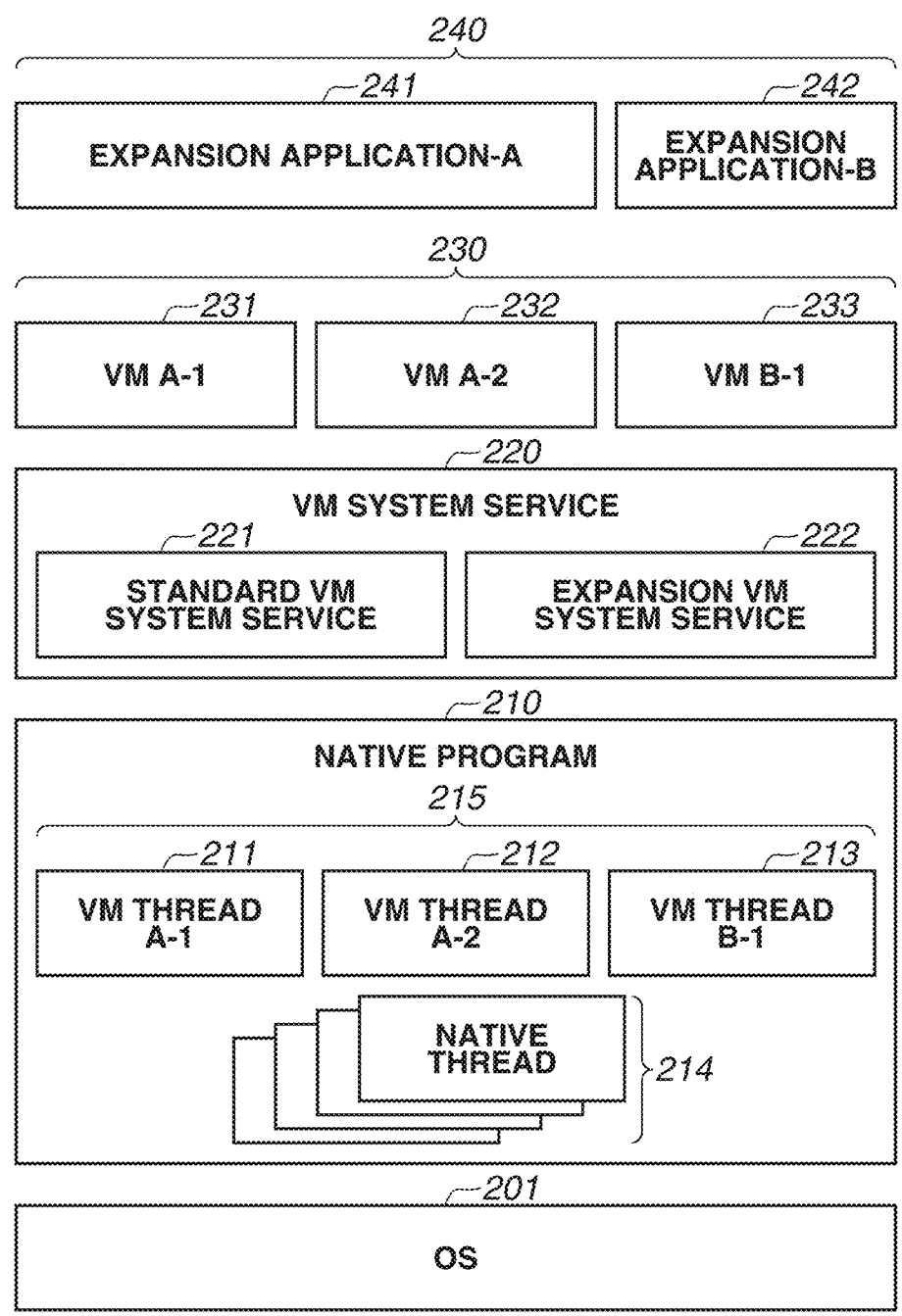
FIG. 2 is a block diagram illustrating an execution environment of an expansion application of the image forming apparatus according to the exemplary embodiment.

FIG. 2 is a software block diagram illustrating an example of an execution environment of an expansion application of the image forming apparatus 1 according to the present exemplary embodiment. Modules illustrated in FIG. 2 are implemented by the CPU 101 loading a program stored in the storage 104 onto the RAM 102 and executing the program.

A native program 210 for controlling the image processing unit such as a printer, a facsimile, and a scanner operates on an OS 201. Further, a virtual machine (VM) 230 operates on the OS 201. The VM 230 functions as the execution environment of the expansion application.

The VM 230 is a module that interprets and executes a program for controlling an expansion application 240. The expansion application 240 is operated on the VM 230. A program operated on the VM 230 is operated by a command specific to the VM 230 that is different from a command operated on the CPU 101. This command is referred to as a bytecode. On the other hand, the command specific to the CPU 101 is referred to as a native code.

The native code is operated on the CPU 101. On the other hand, the VM 230 sequentially interprets and processes the bytecode, so that the bytecode is operated on the VM 230. There are provided a VM of one type that sequentially interprets and processes a bytecode as it is and a VM of another type that converts a bytecode into a native code before executing processing. The VM 230 in FIG. 2 is the VM of the former type that sequentially interprets and processes the bytecode. However, the VM 230 may also be the VM of the latter type that converts the bytecode into the native code before executing the processing.

Generally, as with the case of the command operated on a CPU that does not have compatibility, the command operated on the VM does not have compatibility. In other words, a command that can be operated on one VM cannot be operated on a VM of another type. Further, although the VM 230 in FIG. 2 is described as a software module operating on the CPU 101, the VM 230 may also be a hardware module.

In the native program 210, a native thread 214 for controlling the image processing unit such as a printer, a facsimile, and a scanner, and a VM thread 215 for operating the VM 230 are generated. The VM thread 215 is generated in the number corresponding to the number of VMs 230. In the example in FIG. 2, three VM threads, i.e., a VM thread A-1 211, a VM thread A-2 212, and a VM thread B-1 213, are generated.

A VM system service 220 is a utility library commonly used by the expansion applications 240. The expansion application 240 can access each module of the image forming apparatus 1 by calling a function of the VM system service 220. By using the VM system service 220, it is possible to save time and effort taken for developing the expansion application 240.

The VM system service 220 includes a standard VM system service 221 for minimally operating the VM, and an expansion VM system service 222 for providing access to the module of the image forming apparatus 1 or a function of the OS.

The standard VM system service 221 includes a function of loading the expansion application 240. The VM system service 220 associated with an application program interface (API) is called when the VM 230 executes the API specified by the bytecode included in the expansion application 240.

The VM 230 executes the expansion application 240. The VM 230 is generated for each thread of the expansion application 240. In the example illustrated in FIG. 2, a VM A-1 231 and a VM A-2 232 are generated in correspondence with two threads of an expansion application-A 241, i.e., the VM thread A-1 211 and the VM thread A-2 212. Further, a VM B-1 233 is generated in correspondence with a thread of an expansion application-B 242, i.e., a VM thread B-1 213.

An icon for each of the expansion applications 240 is displayed on a main menu screen displayed on the operation unit 112 of the image forming apparatus 1.

The operation unit I/F 106 detects that an icon has been selected by the user via the operation unit 112, and transmits information about the selected icon to the CPU 101. The CPU 101 receives the information about the selected icon, and activates a program (e.g., expansion application 240) corresponding to the icon selected by the user.

Figure 3:
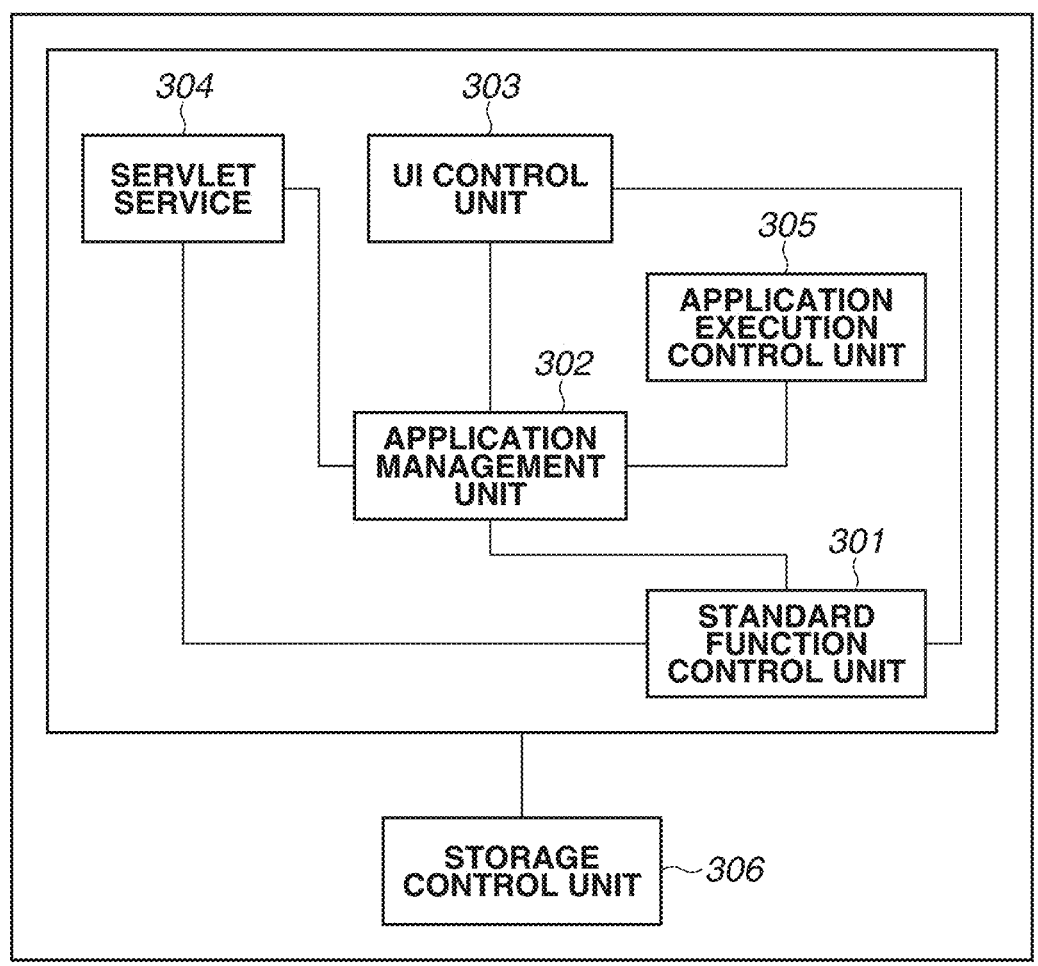
FIG. 3 is a block diagram illustrating software modules operating in the image forming apparatus according to the exemplary embodiment.

FIG. 3 is a block diagram illustrating an example of a configuration of software modules operating on the CPU 101 of the image forming apparatus 1 of the present exemplary embodiment. Each of modules 301 to 306 illustrated in FIG. 3 corresponds to the native program 210 in FIG. 2.

A standard function control unit 301 is a module that executes control of a standard function of the image forming apparatus 1 such as a copying function and a facsimile function, and another control (e.g., control of the USB host I/F 113) for the image forming apparatus 1.

An application management unit 302 is a module that manages installation of the expansion application 240 and activation of the installed expansion application 240.

A user interface (UI) control unit 303 is a module that displays a screen on the operation unit 112 and accepts an operation from the user, and to notify operation information to either the standard function control unit 301 or the application management unit 302 that is an appropriate module.

A servlet service 304 is a module that allocates a request to either the standard function control unit 301 or the application management unit 302 in a case where the image forming apparatus 1 receives the request via the network I/F 110. This allocation of the request is executed based on a uniform resource locator (URL) accessed using the hypertext transfer protocol (HTTP).

An application execution control unit 305 is a module that controls execution of the expansion application 240 activated by the application management unit 302. More specifically, the application execution control unit 305 controls the VM thread 215, the VM system service 220, the VM 230, and the expansion application 240.

The storage control unit 306 is a module that records and manages setting information of the image forming apparatus 1. Each of the above-described modules accesses the storage control unit 306, refers to a setting value, and makes a setting.

Figure 4:
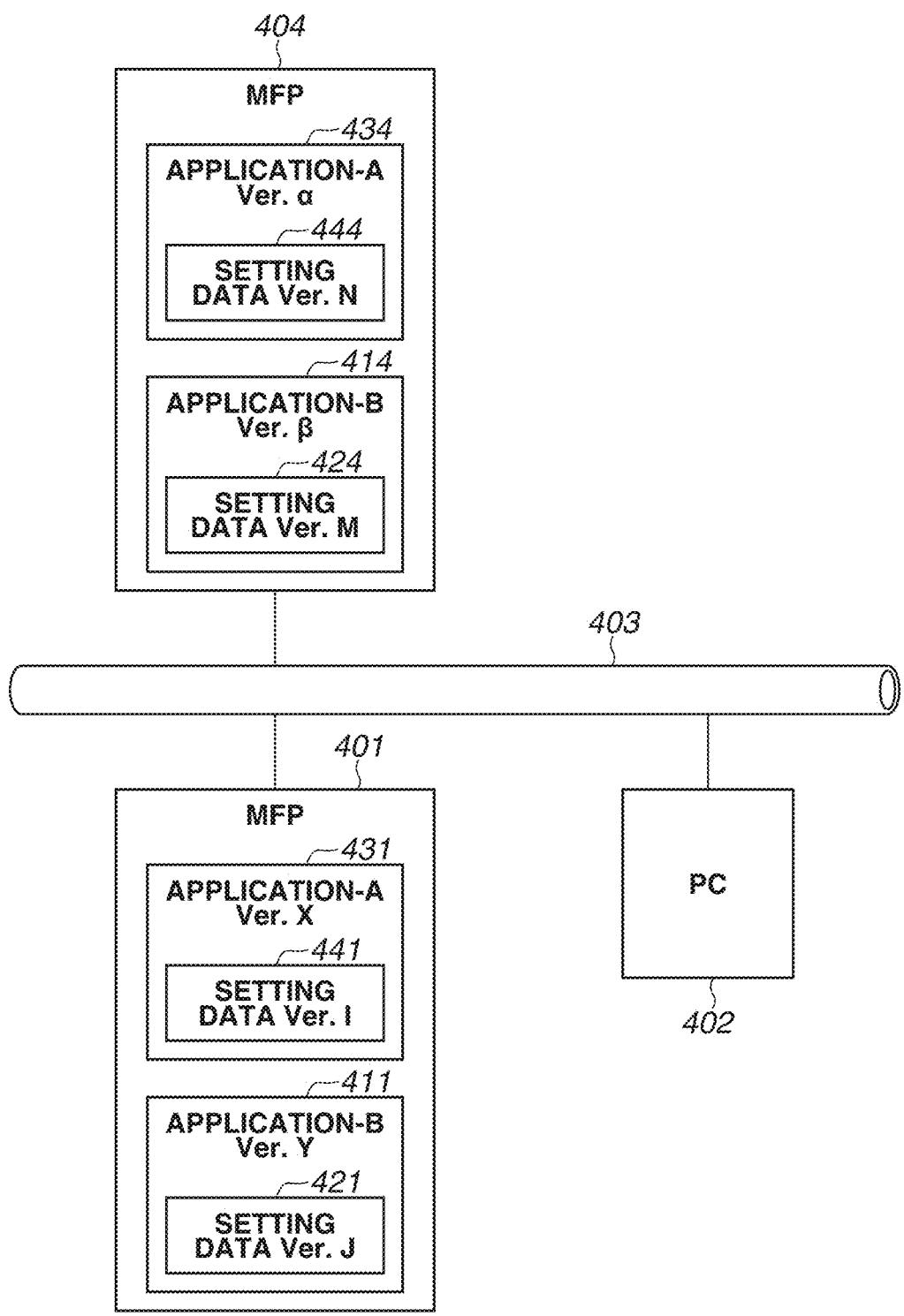
FIG. 4 is a block diagram illustrating a configuration of a printing system including the image forming apparatus according to the exemplary embodiment.

FIG. 4 is a block diagram illustrating an example of a configuration of a printing system including an image forming apparatus according to the present exemplary embodiment. The printing system of the present exemplary embodiment includes a plurality of image forming apparatuses (herein, multifunction peripherals (MFPs) 401 and 404) and an information processing apparatus (personal computer (PC)) 402. Each of the MFPs 401 and 404 has a configuration similar to that of the image forming apparatus 1 illustrated in FIGS. 1 to 3.

The expansion applications (i.e., an application-A and an application-B), which are programs for expanding the function of the image forming apparatus, are installed in each of the MFPs 401 and 404.

The PC 402 can access the MFPs 401 and 404 to make a setting of each of the expansion applications installed therein. For example, the PC 402 may be a personal computer, a tablet-type computer, or a smartphone.

Applications-A 431 and 434 are the same application but in different versions, and there is a difference in functions therebetween. The application-A 431 is operated by using setting data 441. The application-A 434 is operated by using setting data 444. The setting data may be provided in different versions, and the setting data 441 and 444 are in different versions.

Similarly, applications-B 411 and 414 are the same applications but in different versions, and there is a difference in functions therebetween. Further, setting data 421 of the application-B 411 and setting data 424 of the application-B 414 may be provided in different versions, and the setting data 421 and 424 are in different versions.

Figure 5:
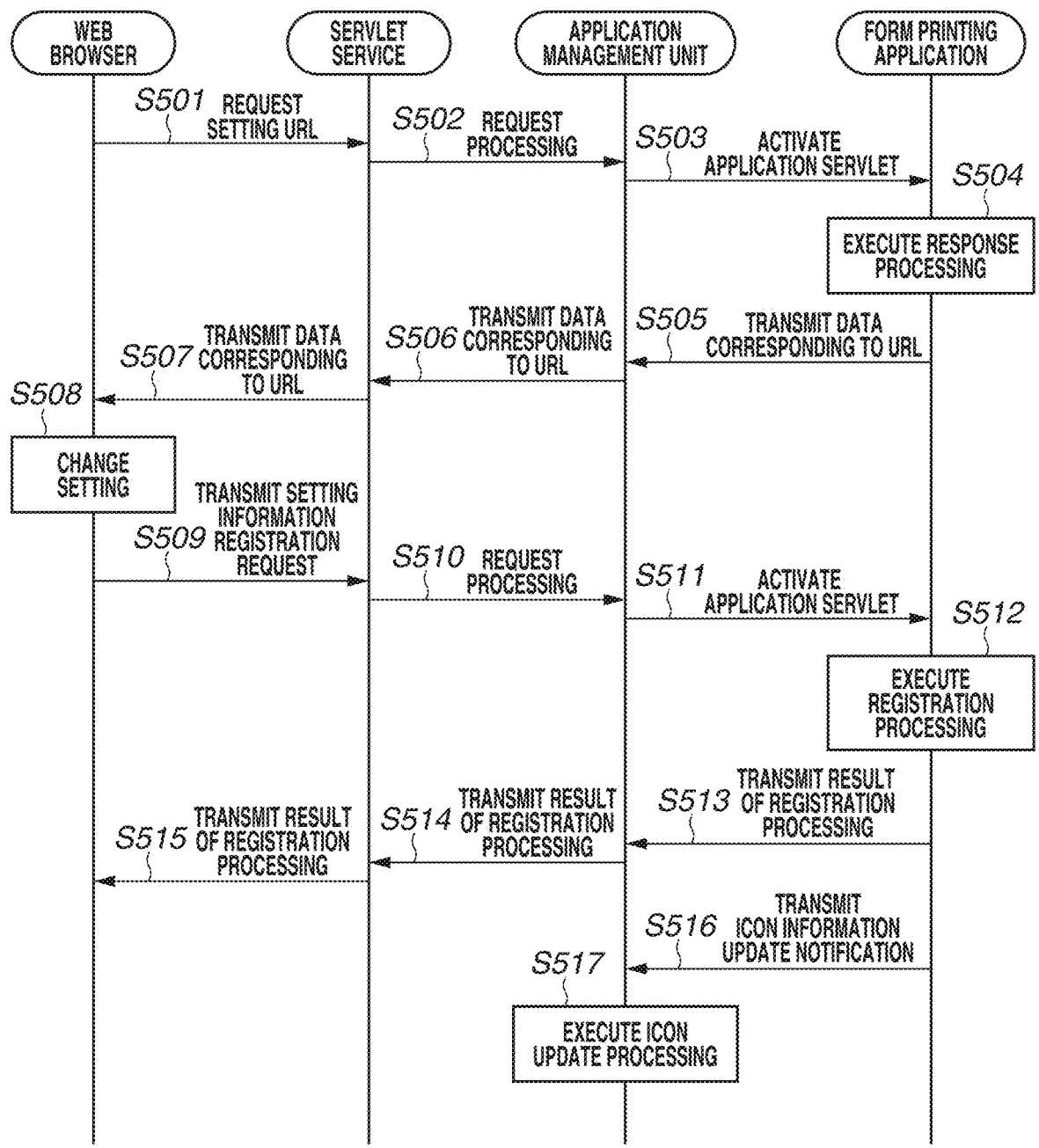
FIG. 5 is a flowchart illustrating an example of setting processing of the expansion application.

FIG. 5 is a flowchart illustrating an example of processing executed to make a setting of the expansion application installed in the image forming apparatus according to the present exemplary embodiment.

Herein, as an example of the expansion application, a form printing application for printing image data in a printing format registered by the user will be described. Although details of the processing may be different for each of the expansion applications, basic setting processing of each of the expansion applications is similar to the processing described in the present exemplary embodiment.

To make the setting of the expansion application, the user accesses the setting target image forming apparatus such as the MFPs 401 and 404 (hereinafter, simply referred to as an image forming apparatus) through a web browser operating on the PC 402, and makes the setting of the application through the web browser. The web browser of the PC 402 is implemented by a CPU (not illustrated) of the PC 402 executes a program stored in a storage device. The CPU 101 of the image forming apparatus loads a program stored in the ROM 103 or the storage 104 onto the RAM 102 as desired, and executes the program to implement each step of processing executed by the image forming apparatus.

First, through the web browser on the PC 402, the user performs an operation for requesting a setting URL used for setting the expansion application from the servlet service 304 of the image forming apparatus. In step S501, in response to this operation, the web browser of the PC 402 transmits a request for the setting URL to the servlet service 304 of the MFP 401.

Then, in step S502, the servlet service 304 receives the request, and requests the application management unit 302 to execute processing corresponding to the request.

The application management unit 302 receives the processing request, and specifies a corresponding expansion application (herein, the form printing application) based on the requested URL. Then, in step S503, the application management unit 302 activates an application servlet of the form printing application. The application servlet of the form printing application is part of the form printing application and is in charge of servlet processing executed within the form printing application. Activation of the application servlet of the form printing application is executed using a procedure similar to a below-described activation procedure of the form printing application illustrated in FIG. 8, and details thereof is omitted herein.

In step S504, the form printing application executes response processing to a request for the URL transmitted thereto. Herein, the form printing application prepares to return a hypertext markup language (HTML) resource for the setting URL. The HTML resource describes an HTML form used to refer to or set information (setting data) for the processing of the form printing application as illustrated in FIG. 6.

Then, in step S505, the form printing application returns the HTML resource prepared in step S504 described above to the application management unit 302.

In step S506, the application management unit 302 receives a response from the form printing application and transmits the response received from the form printing application to the servlet service 304 as it is.

Further, in step S507, the servlet service 304 receives the response from the application management unit 302, and transmits the response received from the application management unit 302 to the web browser as it is.

The web browser receives the response (i.e., the HTML resource prepared by the form printing application) from the servlet service 304, and executes display based on the HTML resource. When a screen based on the HTML resource prepared by the form printing application is displayed on the web browser, in step S508, the user operates and edits the screen displayed on the web browser to change a setting of the application. Herein, it is assumed that the user executes operation for registering a new printing form.

In step S509, in response to the operation executed by the user, the web browser transmits a setting information registration request to the servlet service 304.

Then, in step S510, the servlet service 304 receives the setting information registration request from the web browser, and requests the application management unit 302 to execute processing corresponding to the request.

The application management unit 302 receives the processing request and specifies a corresponding expansion application (herein, the form printing application) based on the requested URL. Then, in step S511, the application management unit 302 activates the application servlet of the form printing application.

In step S512, the form printing application executes registration processing based on the setting information registration request transmitted from the web browser. In this registration processing, for example, the form printing application adds the setting information as illustrated in FIG. 6. Then, in step S513, the form printing application returns a result of the registration processing to the application management unit 302 as a response.

In step S514, the application management unit 302 receives the response from the form printing application, and transmits the response received from the form printing application to the servlet service 304 as it is.

Further, in step S515, the servlet service 304 receives the response from the application management unit 302, and transmits the response received from the application management unit 302 to the web browser as it is.

In step S516, in order to register an icon corresponding to the setting information (herein, printing form) set by the user, the form printing application transmits an icon information update notification to the application management unit 302.

Figure 7:
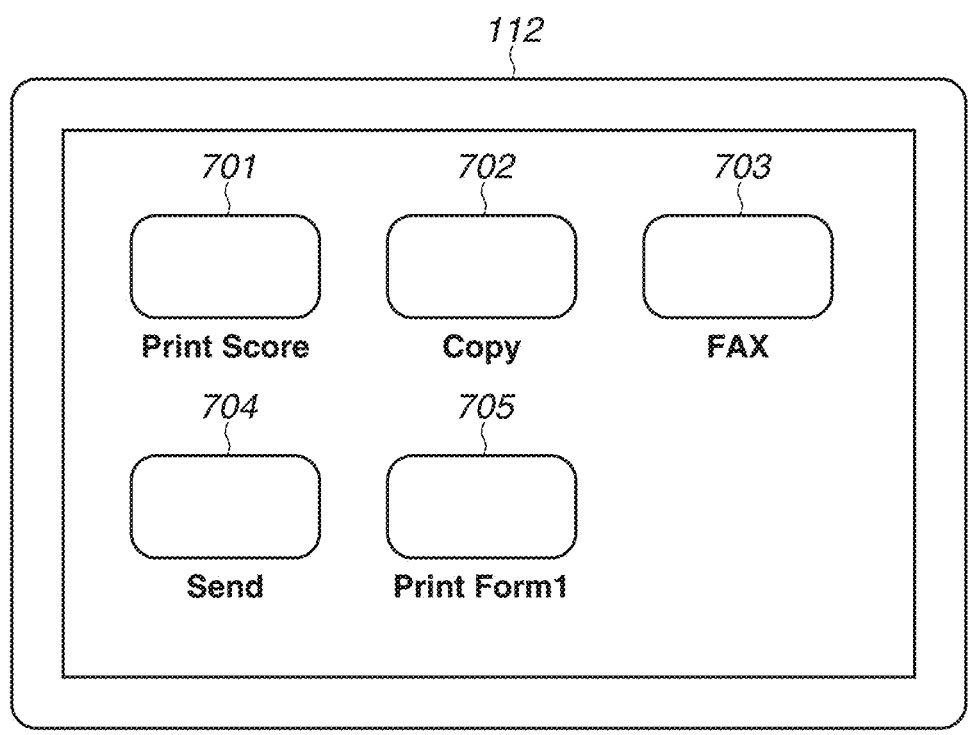
FIG. 7 is a diagram illustrating an example of an operation screen displayed on an operation unit of the image forming apparatus.

In step S517, the application management unit 302 executes icon update processing based on the icon information update notification received from the form printing application. As a result of this processing, the below-described operation screen illustrated in FIG. 7 is constituted.

As described above, through a series of processing described in FIG. 5, the form printing application can change the setting data in response to the request from the user.

FIG. 6 is a diagram illustrating an example of the setting data of the expansion application.

In FIG. 6, the setting data is described in a format of the JavaScript® Object Notation (JSON). However, the format of the setting data can be freely determined by the expansion application. For example, the setting data may be described in a unique binary format or in a format of the extensible markup language (XML).

In addition, the setting data of the expansion application is updated through the processing in step S512 of the flowchart in FIG. 5.

In the example in FIG. 6, two printing forms are registered as the setting data. The form printing application executes form printing processing based on this setting.

Registration information of a first printing form is described in information 601 to 604. Herein, registration information of the printing form for printing a score (five-line staff) is described as an example.

Information 601 indicates a button identification (ID) for identifying an icon, and the information 601 is used for identifying a pressed button.

Information 602 indicates a form name indicating contents of a printing form, and the form name is registered by the user.

Information 603 indicates a target image file to be printed using the form printing, and the image file is registered by the user.

Information 604 indicates print setting in which a color mode and a number of copies for the form printing are collectively set, and the print setting is registered by the user.

Information 611 to 614 indicate registration information of a second printing form, and the contents indicated thereby are similar to those described in information 601 to 604. In this example, registration information for printing a printing form "Form 1" is described.

FIG. 7 is a diagram illustrating an example of an operation screen displayed on the operation unit 112 of the image forming apparatus according to the present exemplary embodiment.

Herein, in addition to various icons of a Copy 702, a FAX 703, and a Send 704 as the standard functions, a Print Score icon 701 and a Print Form 1 icon 705 corresponding to the expansion application are displayed. The Print Score icon 701 corresponds to the setting information (information 601 to 604 in FIG. 6) of the form printing application. The Print Form 1 icon 705 corresponds to the setting information (information 611 to 614 in FIG. 6) of the form printing application. By the user pressing one of these icons, an application corresponding thereto is activated.

Figure 8:
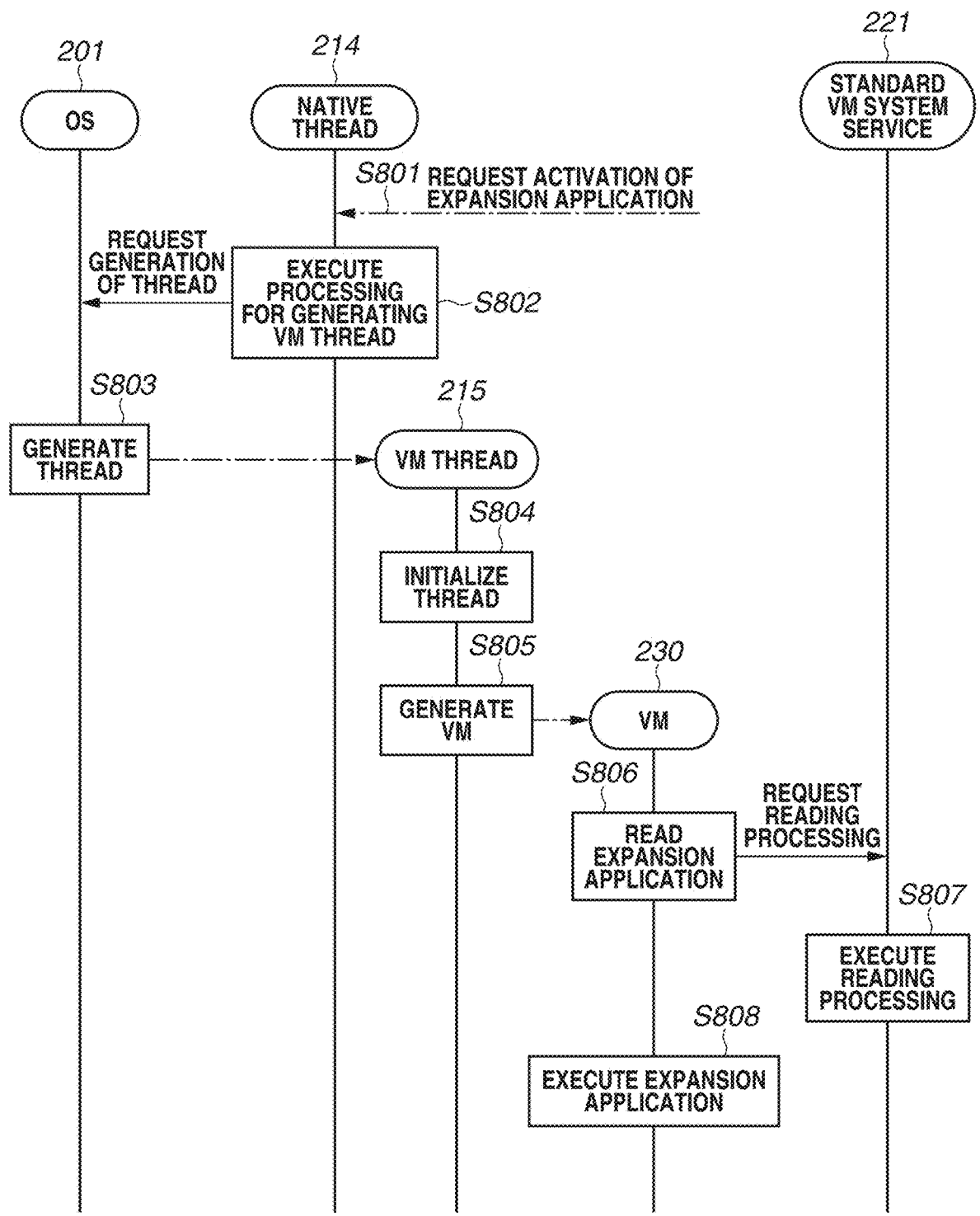
FIG. 8 is a flowchart illustrating an example of processing executed when the expansion application is activated.

FIG. 8 is a flowchart illustrating an example of processing executed when the expansion application is activated by the image forming apparatus according to the present exemplary embodiment. The CPU 101 of the image forming apparatus loads a program stored in the ROM 103 or the storage 104 onto the RAM 102 as desired, and executes the program to implement the processing illustrated in this flowchart.

The user presses the icon (e.g., the icon 701 or 705 in FIG. 7) displayed on the operation unit 112 to request activation of the expansion application. The UI control unit 303 detects the above operation and notifies information about the pressed icon (including application identification information and a button ID of the pressed button) to the application management unit 302. Then, in step S801, a request for activation of the expansion application is notified to the native thread 214 by the application management unit 302. This notification includes the application identification information and the button ID of the pressed button.

In step S802, the native thread 214 receives the notification about the request for activation of the expansion application, and executes processing of generating the VM thread 215. In this processing, the native thread 214 requests the OS 201 to generate a thread. This request includes the application identification information and the button ID.

In step S803, the OS 201 receives the generation request of the thread and generates the VM thread 215. At this time, the application identification information and the button ID are provided to the VM thread 215.

In step S804, the generated VM thread 215 executes initialization of the thread.

Subsequently, in step S805, the VM thread 215 generates the VM 230. At this time, the application identification information and the button ID are provided to the VM 230.

In step S806, the generated VM 230 executes reading processing of the expansion application. In this reading processing of the expansion application, the VM 230 transmits a reading request to the standard VM system service 221. As information for specifying which application to read, the application identification information is included in the reading request.

In step S807, the standard VM system service 221 receives the reading request, and reads data of the specified expansion application into the VM 230. As a result of this processing, the expansion application corresponding to the specified application identification information is loaded onto the VM 230. A data name of the expansion application read through the above processing is a fixed name common to each expansion application. Each of the expansion applications includes a unique name as data.

Next, in step S808, the VM 230 executes the expansion application read through the above-described processing in steps S806 and S807. The contents executed in step S808 vary depending on the program of the expansion application. At this time, the VM 230 notifies the expansion application of a button ID of the pressed icon. The expansion application determines the pressed icon based on the notified information about the button ID, and determines the contents of the processing. The details thereof will be illustrated in FIG. 9.

Figure 9:
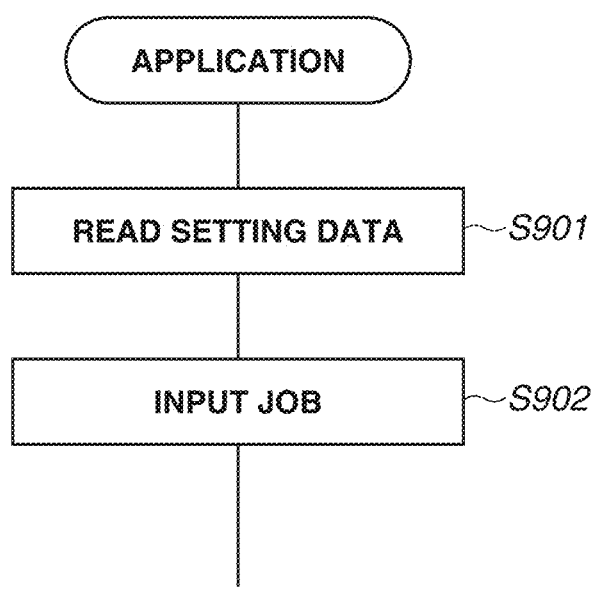
FIG. 9 is a flowchart illustrating an example of details of execution processing of the expansion application.

FIG. 9 is a flowchart illustrating an example of details of the execution processing of the expansion application described in step S808 in FIG. 8.

Herein, processing to be executed when a button (Print Score icon 701) of the form printing application is pressed on the operation screen in FIG. 7 will be described as an example.

In step S901, the form printing application reads the setting data corresponding to the button ID notified by the VM 230, and recognizes the contents set to the application. For example, the contents illustrated in FIG. 6 are recorded as the setting data. Based on the notified button ID, the form printing application extracts the setting data corresponding to the button ID (in the above-described example, the setting data described in the information 601 to 604 in FIG. 6).

Subsequently, in step S902, the form printing application inputs a job to execute form printing based on the extracted setting data. In the above-described example, the form printing application inputs a print job for printing the image file "score.bin" described in the information 603 in FIG. 6 using the print setting "setting Lis" described in the information 604 in FIG. 6.

As a result of the above-described processing, the form printing application can print a registered printing form. For example, the image file "score.bin" can be printed using the print setting "setting1.js".

Figure 10:
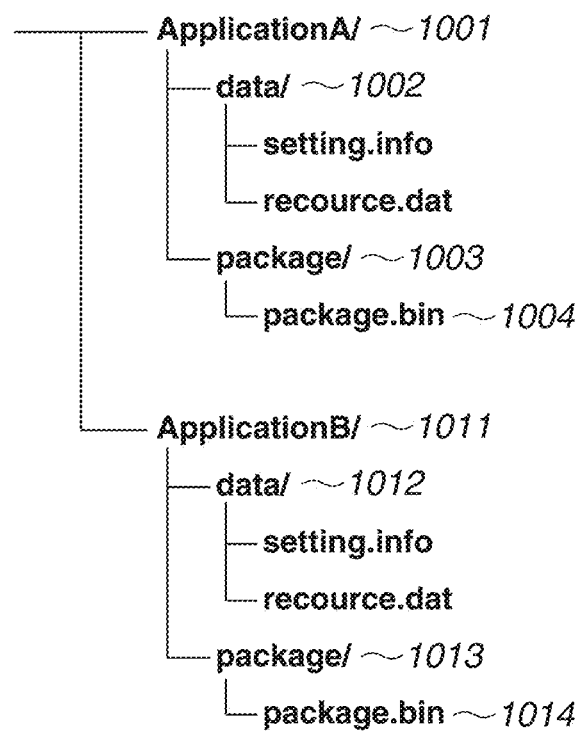
FIG. 10 is a diagram illustrating an example of information about the expansion application stored in the image forming apparatus.

FIG. 10 is a diagram illustrating an example of information about the expansion application stored in the storage 104 of the image forming apparatus according to the present exemplary embodiment.

The storage 104 is managed using a file system, and data is stored in a directory structure. Data of the expansion application is managed being sorted into directories for respective applications. Data of the application-A is stored in directories 1001 to 1003.

The directory 1001 is a root directory that manages the data of the application-A.

The root directory of the application includes a data directory and a package directory.

The data directory 1002 retains information such as setting data of the application that is generated dynamically. Contents and a data format of the information written into the data directory 1002 may be different for each of the applications.

The package directory 1003 retains static information such as a script file describing an operation of the application and a resource file of image data to be displayed on the screen. The script file and the resource file are archived in one of the files in a package.bin 1004 within the package directory 1003.

Similarly, data of the application-B is stored in the directories 1011 to 1013.

Figure 11:
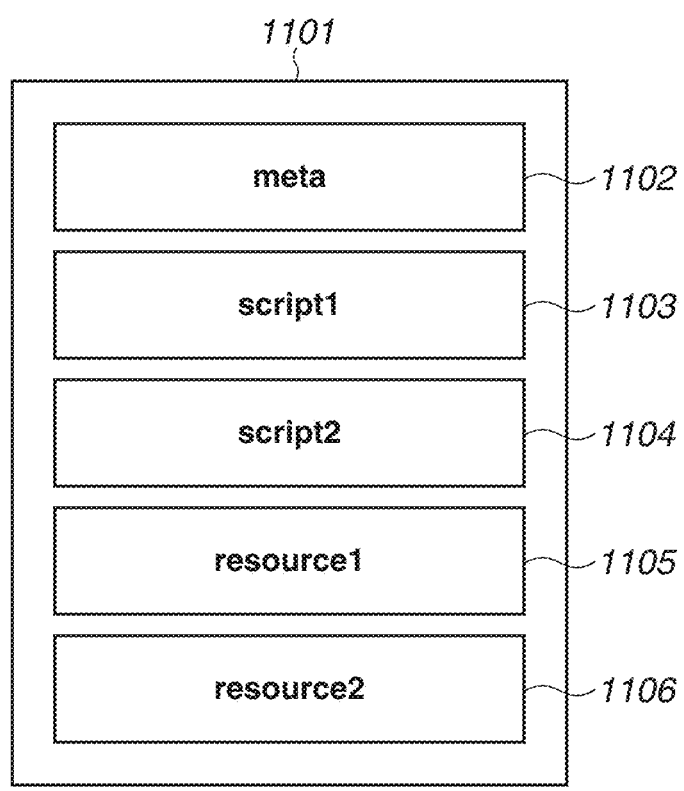
FIG. 11 is a diagram illustrating an example of static information of the expansion application.

FIG. 11 is a diagram illustrating an example of a structure of a package.bin as a file that retains static information of the expansion application illustrated in FIG. 10.

A package.bin 1101 is an archive that retains static information of the application, and the package.bin 1101 corresponds to the package.bin 1004 and a package.bin 1014 illustrated in FIG. 10. The package.bin 1101 includes a meta file 1102 indicating identification information and a version of the application. Further, the package.bin 1101 includes script files 1103 and 1104 each describing operation of the application and resource files 1105 and 1106 each storing image data and a display message.

FIG. 12 is a diagram illustrating an example of a structure of the meta file 1102 illustrated in FIG. 11.

Information 1201 indicates an ID for identifying the application.

Information 1202 indicates an application name.

Information 1203 indicates version information of the application (i.e., application version). The application version 1203 is updated when a function of the application is added or a defect thereof is corrected.

Information 1204 indicates version information of the setting data of the application (i.e., setting data version). The setting data version 1204 is updated in a case where processing of some kind is used for performing data exchange due to addition of an item of the setting data or change of the format.

The application version 1203 and the setting data version 1204 of the application are updated without synchronization. For example, even if the application version 1203 is updated when a defect of the application is corrected, the setting data version 1204 is not updated if the setting data is unchanged.

Information 1205 indicates information by which an importable setting data version can be specified (i.e., setting data compatible version). Import processing will be described below.

Although the meta file can store the information 1201 to 1205, there is a case where the setting data version 1204 or the setting data compatible version 1205 is not included therein.

Figure 13:
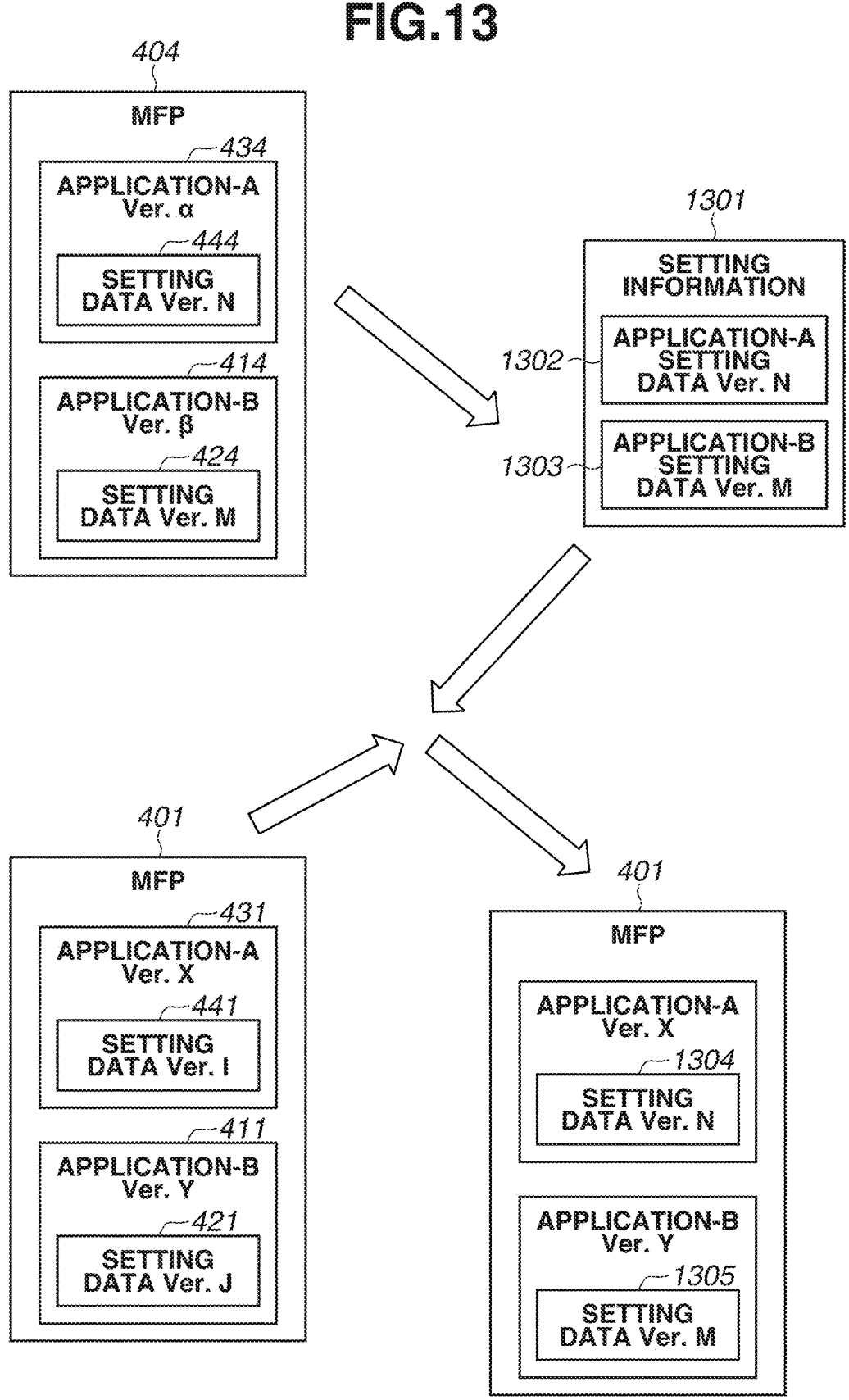
FIG. 13 is a diagram illustrating export and import processing of setting data.

FIG. 13 is a diagram illustrating an outline of the processing for reflecting the setting data of the expansion application installed in the MFP 404 on the MFP 401.

First, the application management unit 302 of the MFP 404 generates setting information 1301 from application setting data 444 and 424 set to the MFP 404.

The setting information 1301 includes setting data 1302 for restoring the setting data 444 of the application-A and setting data 1303 for restoring the setting data 424 of the application-B.

More specifically, the application management unit 302 generates the setting data 1302 and 1303 based on the information retained in the data directories 1002 and 1012 of the application illustrated in FIG. 10. Herein, the application management unit 302 executes the processing without identifying the file type (i.e., setting data or resource data).

Next, the application management unit 302 of the MFP 401 reflects the setting information 1301 on the MFP 401. Accordingly, with respect to the application-A, setting data of the MFP 401 is rewritten from the setting data 441 to the setting data 1304. Similarly, with respect to the application-B, the setting data 421 is rewritten to the setting data 1305.

The above-described processing is executed when the setting data versions of the application setting data 1302 and 1303 included in the setting information 1301 as a reflection source and the setting data versions of the setting data 441 and 421 as reflection destinations have compatibility. The application setting data without compatibility is not rewritten, and the original setting data is kept.

Generating the setting information 1301 from the setting data 444 and 424 of the MFP 404 is referred to as export. Reflecting the setting information 1301 to the setting data 441 and 421 of the MFP 401 is referred to as import. The user can provide an instruction for the export or the import from the operation unit 112 or the web browser of the PC 402.

Figure 14:
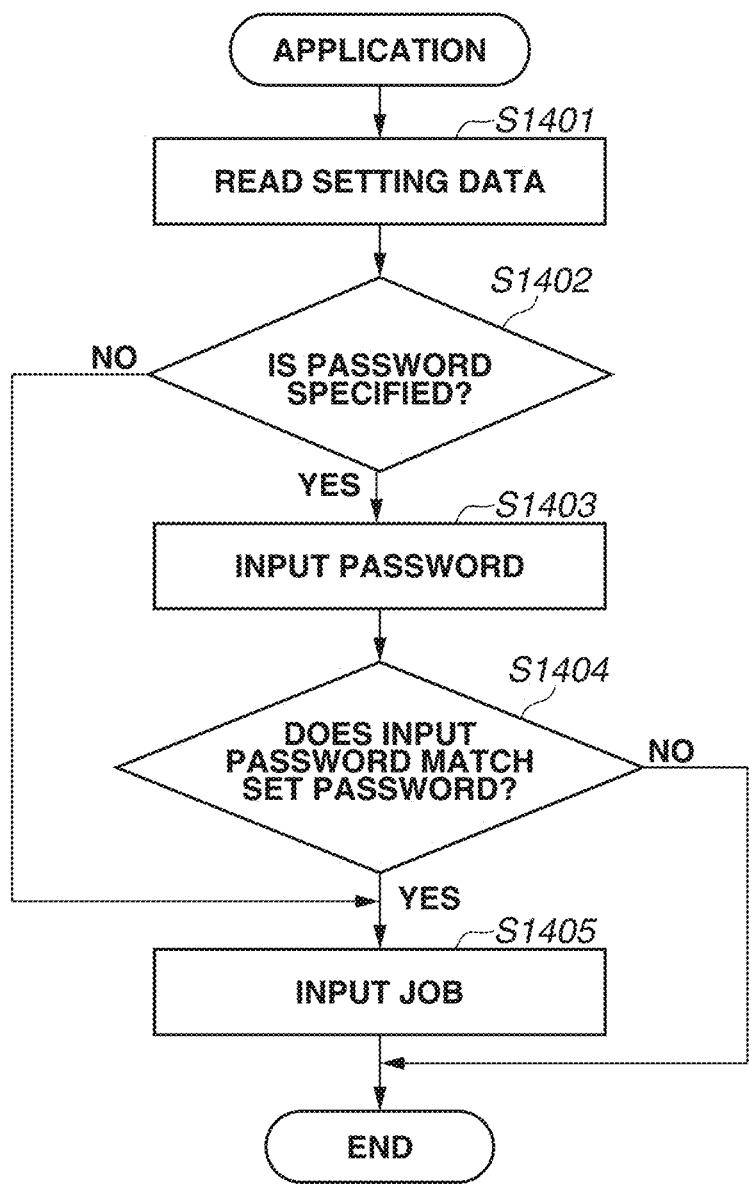
FIG. 14 is a flowchart illustrating an example of processing of the expansion application to which a function is added.

FIG. 14 is a flowchart illustrating an example of processing of the expansion application to which a password authentication function is added.

Herein, a form printing application is taken as an example of the expansion application. A purpose of the password authentication function is to restrict use of the form printing application to a user who knows a password by registering the password together with form information when a printing form is registered. In addition, processing of this flowchart is executed and controlled by the form printing application. In other words, the CPU 101 of the image forming apparatus loads a program stored in the ROM 103 or the storage 104 onto the RAM 102 as desired, and executes the program to implement the processing illustrated in this flowchart.

First, in step S1401, the form printing application reads setting data.

Next, in step S1402, the form printing application determines whether a password is specified to the setting data read in step S1401. If the form printing application determines that a password is not specified to the setting data (NO in step S1402), the processing proceeds to step S1405.

On the other hand, if the form printing application determines that a password is specified to the setting information (YES in step S1402), the processing proceeds to step S1403.

in step S1403, the form printing application accepts input of a password from the user. Then, the processing proceeds to step S1404 if the user inputs the password.

In step S1404, the form printing application determines whether the input password matches the password set thereto. If the form printing application determines that the input password matches the set password (YES in step S1404), the processing proceeds to step S1405.

In step S1405, the application management unit 302 inputs a print job of the registered form, and ends the processing of this flowchart.

On the other hand, if the form printing application determines that the input password does not match the set password (NO in step S1404), the form printing application ends the processing of this flowchart without inputting the job.

FIG. 15 is a diagram illustrating an example of setting data of the form printing application to which the password authentication function is added.

When the setting data in FIG. 15 is compared with the setting data of the form printing application to which the password authentication function is not added in FIG. 6, a difference is that information 1501 is added to the setting data in FIG. 15. The information 1501 indicates that a password is set to a printing form registered in a button ID of 2. In step S1402 of the above-described flowchart in FIG. 14, presence or absence of this setting is determined.

FIG. 16 is a diagram illustrating an example of information of the meta file 1102 of the form printing application to which the password authentication function has been added.

In FIG. 16, information 1601 indicates a version of the form printing application (i.e., application version). Herein, the application version 1601 is updated to 2 because the password authentication function is added.

Information 1602 indicates a version of the setting data (i.e., setting data version). If the setting data to which the password is registered is imported into the old application to which the password authentication function is not added, printing is executed without authenticating the password, and thus it is a problem in terms of security. Thus, the setting data version is updated to 2.

Information 1603 indicates a compatible version of setting data (i.e., setting data compatibility version). Herein, the setting data compatible version 1603 is set to 1 because it is possible to read setting data of the application in an old version to which the password authentication function is not added.

Figure 17:
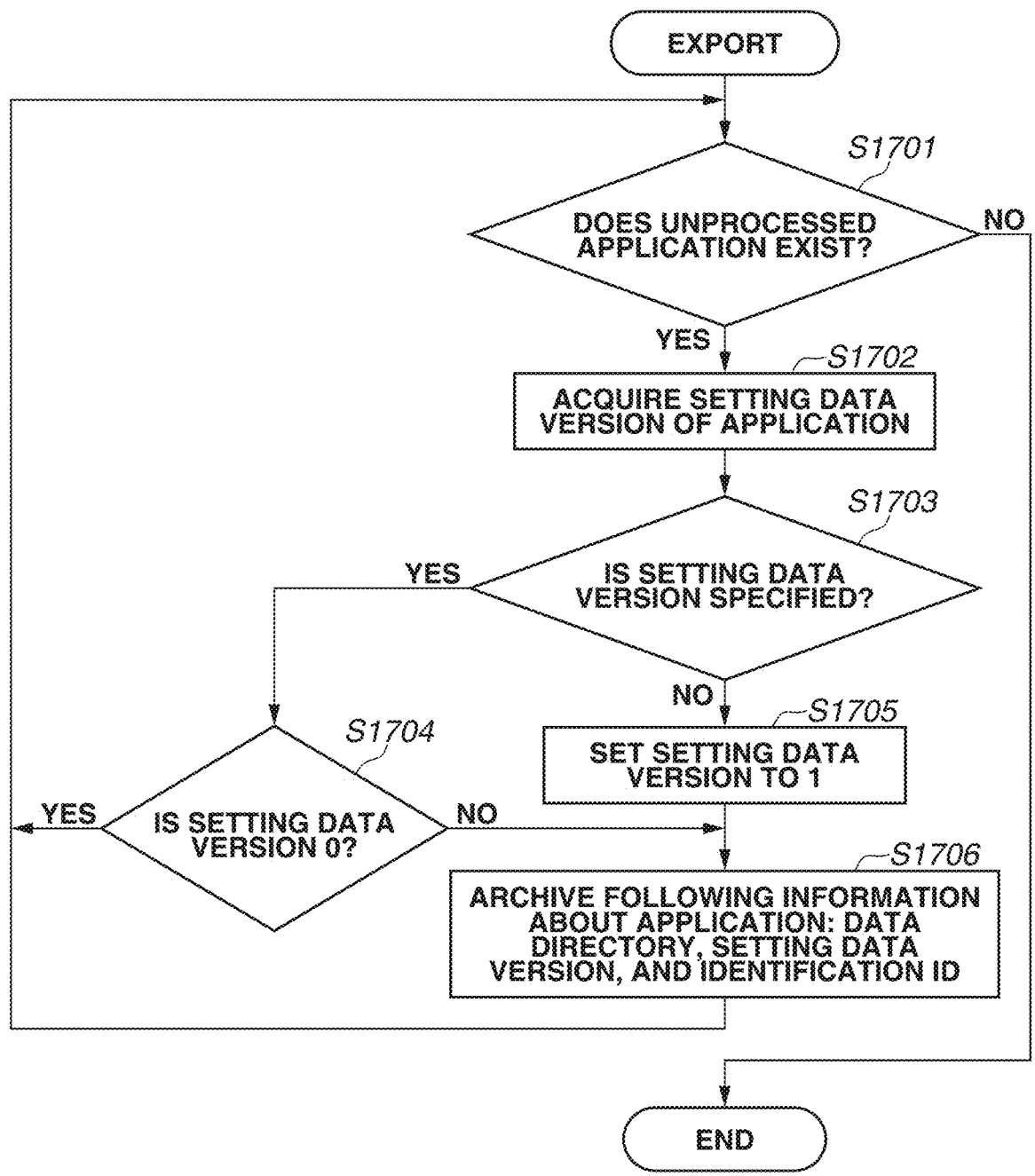
FIG. 17 is a flowchart illustrating an example of export processing according to the exemplary embodiment.

FIG. 17 is a flowchart illustrating an example of export processing of the setting information executed by the image forming apparatus according to the present exemplary embodiment. This processing is executed by the application management unit 302. In other words, the CPU 101 of the image forming apparatus loads a program stored in the ROM 103 or the storage 104 onto the RAM 102 as desired, and executes the program to implement the processing illustrated in this flowchart.

If the user inputs an export instruction through the operation unit 112 or the web browser of the PC 402, the instruction is notified to the application management unit 302, so that the processing of this flowchart is started. In addition, it is assumed that specification of an export destination is included in the export instruction. Further, as the export destination, for example, the USB storage 114, a PC, or a storage area in the network such as the cloud can be specified.

First in step S1701, the application management unit 302 determines presence or absence of an unprocessed application. If the application management unit 302 determines that the unprocessed application exists (YES in step S1701), the processing proceeds to step S1702.

In step S1702, the application management unit 302 selects one unprocessed application as an export target, and acquires a setting data version (corresponding to the setting data version 1204 in FIG. 12) from the meta file 1102 of the application. Hereinafter, the application selected as the export target is referred to as a current application.

Next, in step S1703, the application management unit 302 determines whether a version is specified to the setting data version acquired in step S1702. If the application management unit 302 determines that the version is specified to the setting data version (YES in step S1702), the processing proceeds to step S1704.

In step S1704, the application management unit 302 determines whether a value of the setting data version acquired in step S1702 is 0. If the application management unit 302 determines that the value of the setting data version is 0 (YES in step S1704), the application management unit 302 determines that export processing is prohibited, and returns the processing to step S1701 without executing the export processing.

On the other hand, in step S1704, if the application management unit 302 determines that the value of the setting data version is a value other than 0 (NO in step S1704), the processing proceeds to step S1706.

Further, in step S1703, if the application management unit 302 determines that the version is not specified to the setting data version (NO in step S1703), the processing proceeds to step S1705. In step S1705, the application management unit 302 sets the setting data version to 1. Then, the processing proceeds to step S1706. If the setting data version is not specified, it is assumed that a version thereof is a version of the application developed before supporting the export function. Thus, in the present exemplary embodiment, the setting data version is set to 1 so that export processing of the application of such a version can also be executed.

In step S1706, the application management unit 302 archives all files existing in the data directory (e.g., data directory 1002 or 1012 in FIG. 10) of the current application, the above-described setting data version, and an application identification ID. A result of the above archive corresponds to the setting data 1302 (or 1303) of the application illustrated in FIG. 13. In other words, export data of the current application is generated. In addition, the setting information 1301 is generated by executing the processing on all the applications.

After the above-described processing in step S1706, the application management unit 302 returns the processing to step S1701.

Then, in step S1701, if the application management unit 302 determines that export processing is executed on all the applications (NO in step S1701), the processing of this flowchart is ended. In addition, the export data archived for each application in step S1706 can be sequentially output to the export destination, or the export data can be output to the export destination when the processing has been completed for all the applications.

Figure 18:
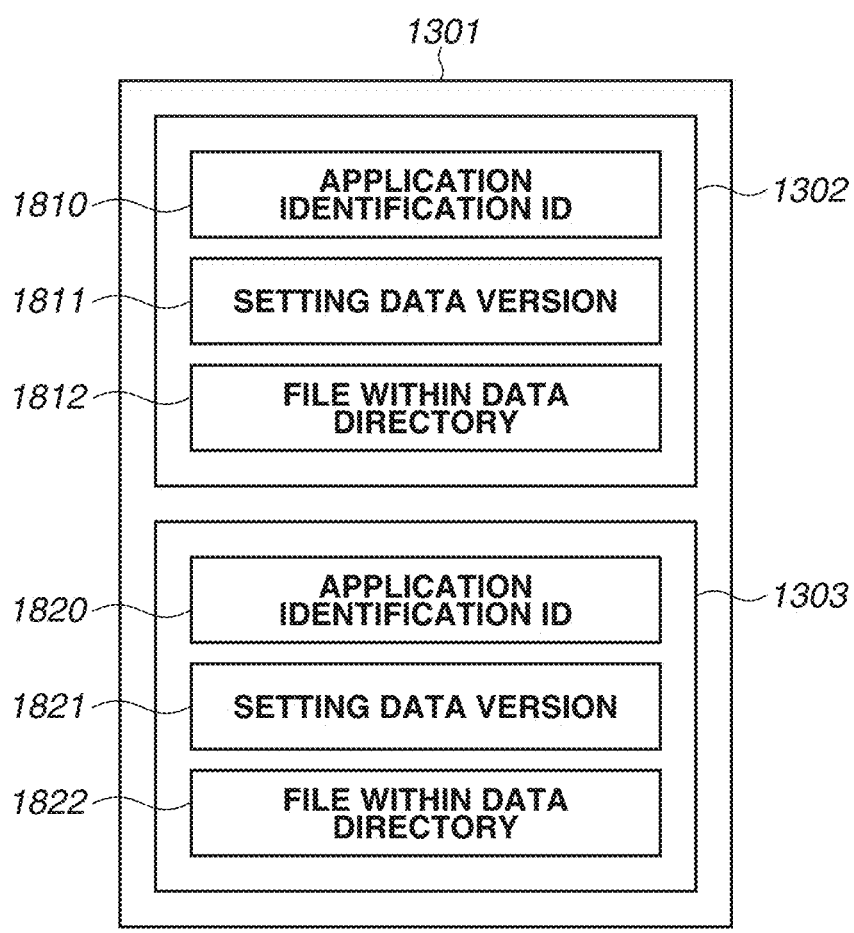
FIG. 18 is a block diagram illustrating a structure of setting information generated through the export processing according to the exemplary embodiment.

FIG. 18 is a block diagram illustrating an example of a structure of the setting information 1301 in FIG. 13 generated through the export processing illustrated in FIG. 17.

The setting information 1301 includes the setting data 1302 for restoring the setting data of the application-A. An application identification ID 1810, a setting data version 1811, and a file 1812 within the data directory (including setting data of the application) are stored in the archive of the setting data 1302.

Similarly, the setting information 1301 includes the setting data 1303 for restoring the setting data of the application-B, and respective pieces of information 1820 to 1822 are stored therein.

As described above, through the export processing, the setting data can be exported by adding the setting data version (1811 or 1821) stored as the information about the application to the setting data of the application as an export target.

Figure 19:
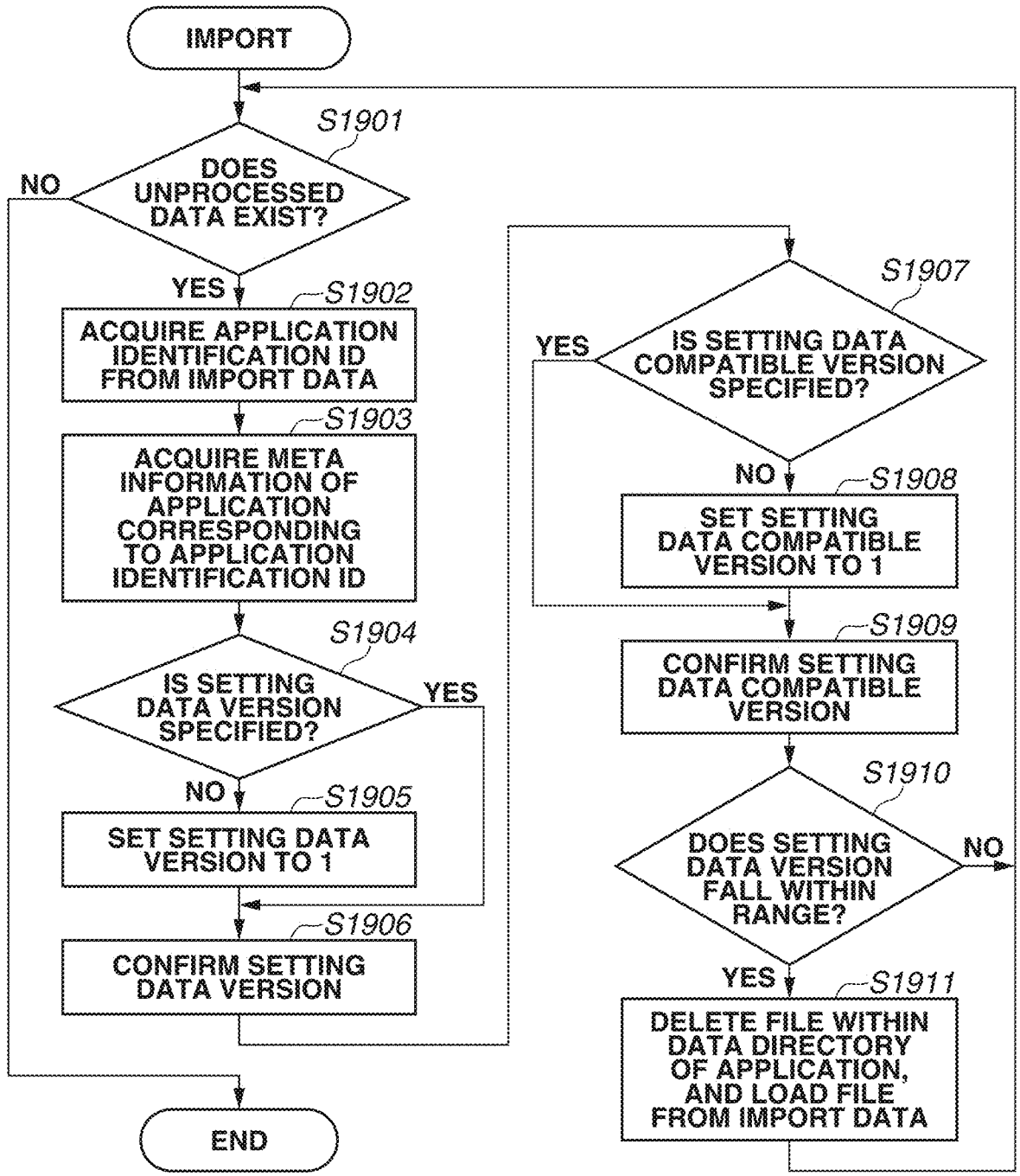
FIG. 19 is a flowchart illustrating an example of import processing according to the exemplary embodiment.

FIG. 19 is a flowchart illustrating an example of import processing of the setting information executed by the image forming apparatus according to the present exemplary embodiment. The processing of this flowchart is executed through control of the application management unit 302. In other words, the CPU 101 of the image forming apparatus loads a program stored in the ROM 103 or the storage 104 onto the RAM 102 as desired, and executes the program to implement the processing illustrated in this flowchart. Herein, the processing will be described by using the setting information 1301 as the setting information.

If the user inputs an import instruction through the operation unit 112 or the web browser of the PC 402, the instruction is notified to the application management unit 302, so that the processing of this flowchart is started. In addition, it is assumed that specification of the setting information as an import target is included in the import instruction. Further, for example, the setting information (e.g., setting information 1301 in FIG. 18) stored in the USB storage 114, a PC, and a storage area in the network such as the cloud can be specified as the setting information as the import target.

First, in step S1901, the application management unit 302 divides the setting information 1301 specified as the import target into pieces of import data (i.e., information 1302 and 1303 in FIG. 18) of respective applications. Then, the application management unit 302 determines presence or absence of unprocessed import data. If the application management unit 302 determines that the unprocessed import data exists (YES in step S1901), the application management unit 302 selects one unprocessed import data as the import target (hereinafter, referred to as current import data), and the processing proceeds to step S1902.

In step S1902, the application management unit 302 reads the current import data, and acquires the application identification ID from the import data.

Next, in step S1903, the application management unit 302 specifies the expansion application (hereinafter, referred to as a current expansion application) corresponding to the application identification ID (e.g., the application identification ID 1810 or 1820 in the example in FIG. 18) acquired in step S1902. Further, as information about the current expansion application, the application management unit 302 acquires meta information (corresponding to the meta file 1102 in FIG. 11) from the information stored in the storage 104.

Next, in step S1904, the application management unit 302 determines whether the setting data version (corresponding to the setting data version 1204 in FIG. 12) is specified in the meta information acquired in step S1903. If the application management unit 302 determines that the setting data version is not specified in the meta information (NO in step S1904), the processing proceeds to step S1905.

In step S1905, the application management unit 302 sets the setting data version to 1, and the processing proceeds to step S1906.

On the other hand, in step S1904, if the application management unit 302 determines that the setting data version is specified in the meta information (YES in step S1904), the processing simply proceeds to step S1906.

In step S1906, the application management unit 302 confirms the version specified in the meta information or the version specified in step S1905 as the setting data version of the current application. Hereinafter, this setting data version is referred to as X.

Then, in step S1907, the application management unit 302 determines whether the setting data compatible version (corresponding to the setting data compatible version 1205 in FIG. 12) is specified in the meta information. If the application management unit 302 determines that the setting data compatible version is not specified (NO in step S1907), the processing proceeds to step S1908.

In step S1908, the application management unit 302 sets the setting data compatible version to 1, and the processing proceeds to step S1909.

On the other hand, in step S1907, if the application management unit 302 determines that the setting data compatible version is specified (YES in step S1907), the processing proceeds to step S1909.

In step S1909, the application management unit 302 confirms the version specified in the meta information or the version specified in step S1908 as the setting data compatible version of the current application. Hereinafter, this setting data compatible version is referred to as Z.

Next, in step S1910, the application management unit 302 checks the setting data compatible version to determine whether the setting data version of the current setting data satisfies the following formula.

$X \geq \text{setting data version } 1811 \geq Z$

In other words, the application management unit 302 determines whether the setting data version of the current setting data falls within a range based on the setting data version X confirmed in step S1906 and the setting data compatible version Z confirmed in step S1909.

If a condition expressed by the above formula is satisfied (i.e., if the setting data version of the current setting data falls within the range based on the versions X and Z), the application management unit 302 determines that the current setting data has compatibility with the reflection destination and permits the import processing. Then, the processing proceeds to step S1911.

In step S1911, in order to execute the import processing of the current setting data, the application management unit 302 deletes all the files within the data directory of the current expansion application (with respect to the application-A, the data directory 1002 in FIG. 10). Further, the application management unit 302 loads the file within the data directory of the current setting data and updates the file within the data directory of the current expansion application (i.e., import processing). Then, the processing returns to step S1901, and the application management unit 302 executes similar processing on the remaining setting data in the setting information 1301.

On the other hand, in step S1910, if the condition expressed by the above formula is not satisfied (i.e., if the setting data version of the current setting data does not fall within the range based on the versions X and Z), the application management unit 302 determines that the current setting data does not have compatibility with the reflection destination. In this case, the application management unit 302 prohibits the import processing, and returns the processing to step S1901 without reflecting the current setting data on the current application.

Then, in step S1901, if the application management unit 302 determines that all the import data have already been processed (NO in step S1901), the processing of this flowchart is ended.

Figure 20:
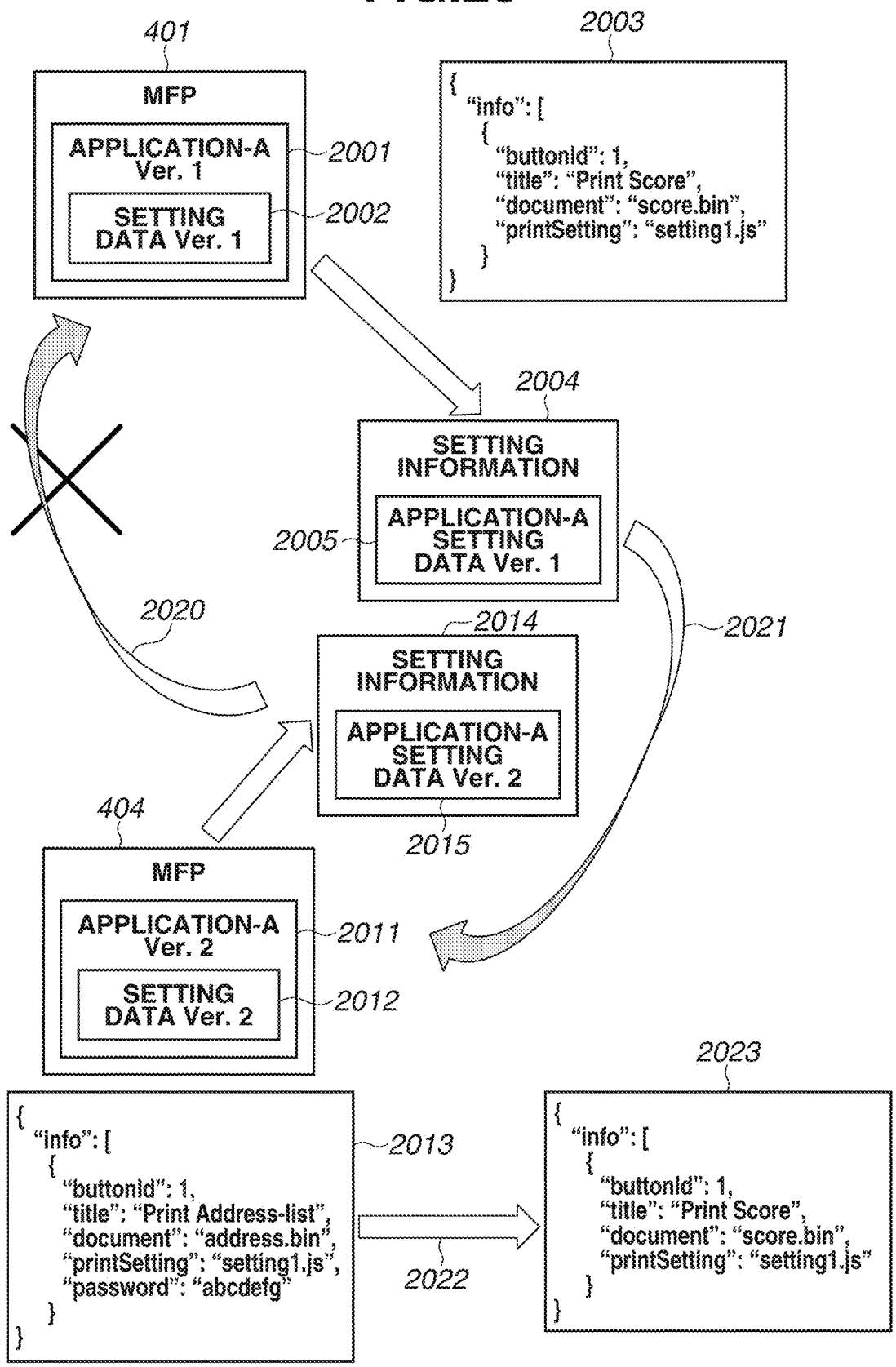
FIG. 20 is a diagram illustrating whether to allow import processing of setting data according to the exemplary embodiment.

FIG. 20 is a diagram illustrating whether to allow the import processing of the setting data according to the exemplary embodiment. Herein, whether to allow the import processing of the setting data executed between the versions before and after addition of the password authentication function to the form printing application will be described as an example.

It is assumed that the application-A as the form printing application is installed in each of the MFPs 401 and 404. Then, an application-A 2001 is assumed as a version (Ver. 1) before the password authentication function is added. An application-A 2011 is assumed as a version (Ver. 2) after the password authentication function is added.

Further, setting data 2002 and 2012 are registered in the respective applications-A 2001 and 2011 each as information about a printing form. Specific registration contents of the setting data 2002 and 2012 are respectively described in setting data 2003 and 2013. The setting information 2004 and 2014 are setting information respectively exported from the applications-A 2001 and 2011, and include application setting data 2005 and 2015 for restoring respective data.

An arrow 2020 indicates that the setting information 2014 of the application-A 2011 of the version (Ver. 2) to which the password authentication function has been added cannot be imported to the MFP 401. This is because the version of the setting data 2015 retained in the setting information 2014 falls outside the range of the setting data version compatible with the application-A 2001 installed in the MFP 401, i.e., the version thereof does not have compatibility.

An arrow 2021 indicates that the setting information 2004 of the application-A 2001 of the version (Ver. 1) to which the password authentication function is not added can be imported to the MFP 404. This is because the version of the setting data 2005 retained in the setting information 2004 falls within the range of the setting data version compatible with the application-A 2011 installed in the MFP 404.

An arrow 2022 indicates that the setting data 2012 (specifically, the setting data 2013) of the application-A 2011 can be rewritten (updated) to the setting data 2023 through the import processing of the setting data 2005 (specifically, the setting data 2003).

As described above, in the image forming apparatus according to the present exemplary embodiment, the system stores, for each application, the meta file 1102 including the setting data version 1204 and the setting data compatible version 1205 as information about the application. Further, when import processing is executed, compatibility of the setting data as the import target is determined by using the version of the setting data and the information about the application corresponding to the setting data as the import target (i.e., setting data version 1204 and the setting data compatible version 1205). In other words, whether to allow the import processing can be determined. Then, execution or non-execution (permission or prohibition) of the import processing of the setting data as the import target is controlled based on the determination result. With this configuration, for example, the setting data 2003 to which the password authentication function is not added can be imported into the form printing application (application-A 2011) to which the password authentication function having compatibility has been added. On the other hand, it is possible to prohibit the setting data 2013 to which the password authentication function has been added from being imported into the form printing application (application-A 2001) to which the password authentication function without compatibility is not added. As described above, according to the present exemplary embodiment, in a case where setting data is to be imported between the expansion applications in different versions, it is possible to import only the setting data having compatibility, which can be imported securely. Accordingly, it is possible to prevent incorrect operation of the expansion application caused by import of the setting data of the expansion application of a different version. Thus, the setting data of the application can be securely imported between the plurality of apparatuses.

The information processing apparatus such as the image forming apparatus according to the present exemplary embodiment can be used as below. For example, the setting data of an OS or an application within the information processing apparatus is backed-up in a USB storage, a PC, or a storage area in the network such as the cloud, and the back-up data can be imported after the OS or the application is updated. In this case, only the importable setting data can be securely imported after the update, so that the OS or the application can be prevented from being operated incorrectly.

In the image forming apparatus according to the present exemplary embodiment, import and export functions of the setting data of the application are included in the system of the image forming apparatus. Thus, the import and export functions do not have to be created in the application. Thus, it is possible to reduce a load of development of the application.

Structures and contents of various types of data described above are not limited thereto, and thus the data may include various structures and contents depending on the use or the purpose.

While the exemplary embodiment of the present disclosure has been described above, it is to be understood that the present disclosure can also be embodied as, for example, a system, an apparatus, a method, a program, or a storage medium. More specifically, the present disclosure may be applied to a system including a plurality of devices, or may be applied to an apparatus including a single device. The above-described exemplary embodiments disclose practical implementations of information processing technology and how improved outcomes can be achieved.

Furthermore, any configuration in which the above-described exemplary embodiments are combined is also included in the present disclosure.

According to the present disclosure, the setting data can be securely imported between the applications in different versions. As a result, it is possible to prevent incorrect operation of the expansion application caused by import of the setting data of the expansion application of a different version.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit, or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU)), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-110666, filed Jun. 8, 2018, which is hereby incorporated by reference herein in its entirety.

What is claimed is:

1. An information processing apparatus in which an application can be executed, the information processing apparatus comprising:
   a storage unit configured to store setting data of the application, a version of the setting data, and information to identify compatibility of the setting data;
   a unit configured to execute the application with reference to the setting data stored in the storage unit;
   a receiving unit configured to receive setting data of the application and a version of the setting data from an external memory or an external device; and an update unit configured to update the stored setting data of the application in the storage unit with the received setting data of the application by the receiving unit, the version of the received setting data is older than the version of the stored setting data, wherein the update unit does not update the stored setting data with the received setting data based on the version of the received setting data of the application, the version of the stored setting data of the application and the information to identify compatibility of the setting data.

2. The information processing apparatus according to claim 1, wherein, the information to identify compatibility of the setting data is a compatible version of the stored setting data, in a case where the version of the received setting data is within a range of the version of the stored setting data and the compatible version of the stored setting data, the update unit updates the stored setting data with the received setting data.

3. The information processing apparatus according to claim 1, wherein, in a case where the version of the received setting data is not within a range of the version of the stored setting data and the compatible version of the stored setting data, the update unit does not update the stored setting data with the received setting data.

4. The information processing apparatus according to claim 1, wherein the stored setting data of the application includes a password.

5. The information processing apparatus according to claim 1, further comprising an export unit configured to export the stored setting data of the application and the version of the stored setting data.

6. A control method of an information processing apparatus in which an application can be installed and executed, the control method comprising:

storing setting data of the application, a version of the setting data, and information to identify compatibility of the setting data;

executing the application with reference to the setting data stored in the storage unit;

receiving setting data of the application and a version of the setting data from an external memory or an external device; and updating the stored setting data of the application with the received setting data of the application, the version of the received setting data is older than the version of the stored setting data, wherein the updating does not include updating the stored setting data with the received setting data based on the version of the received setting data of the application, the version of the stored setting data of the application and the information to identify compatibility of the setting data.

7. The control method according to claim 6, wherein, the information to identify compatibility of the setting data is a compatible version of the stored setting data, in a case where the version of the received setting data is within a range of the version of the stored setting data and the compatible version of the stored setting data, the updating includes updating the stored setting data with the received setting data.

8. The control method according to claim 6, wherein, in a case where the version of the received setting data is not within a range of the version of the stored setting data and the compatible version of the stored setting data, the updating does not including updating the stored setting data with the received setting data.

9. The control method according to claim 6, wherein the stored setting data of the application includes a password.

10. The control method according to claim 6, further comprising exporting the stored setting data of the application and the version of the stored setting data.

* * * * *